June 10, 1941.  J. M. SHIMER  2,245,117
COUNTERBALANCING EQUIPMENT
Filed April 21, 1939
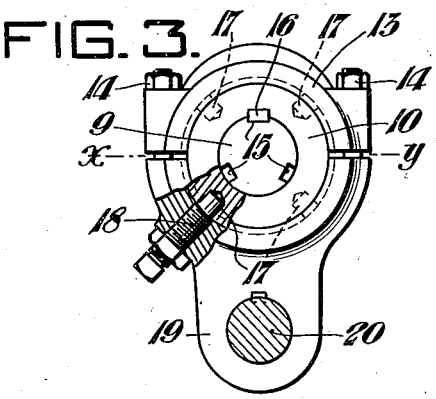
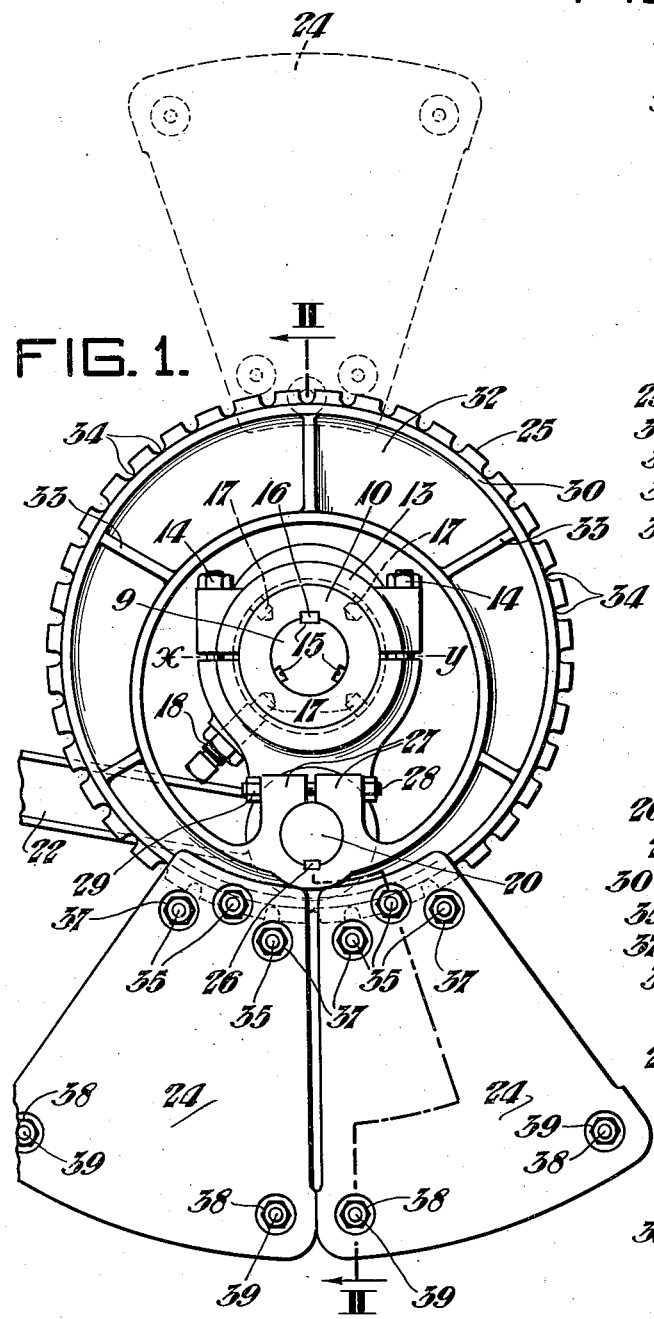
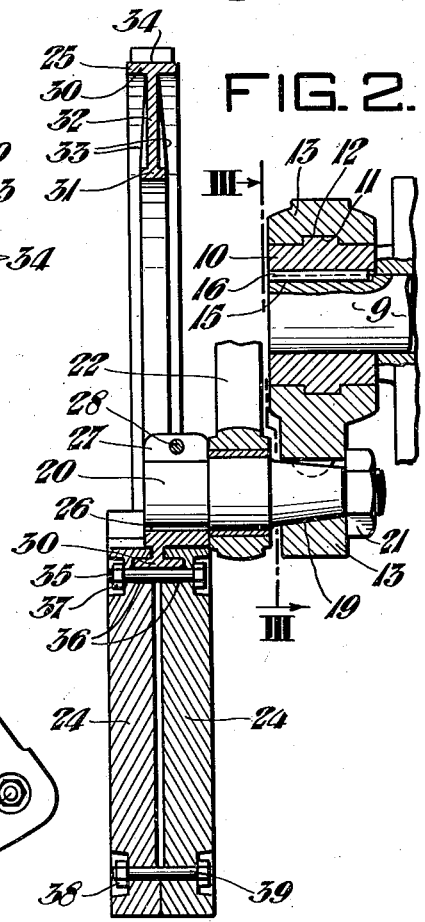
Inventor:
John M. Shimer,
by John E. Jackson
his Attorney.

Patented June 10, 1941

2,245,117

UNITED STATES PATENT OFFICE 2,245,117

COUNTERBALANCING EQUIPMENT

John M. Shimer, Dallas, Tex., assignor to Oil Well Supply Company, a corporation of New Jersey Application April 21, 1939, Serial No. 269,220

3 Claims. (Cl. 74—591)

This invention relates to counterbalances such as used on pumping units, and is characterized by the novel arrangement and coordination of instrumentalities hereinafter more specifically shown, described and claimed.

For a complete disclosure of the invention, reference should be made to the accompanying drawing, in which:

Figure 1 is a vertical elevation of the counterbalance of an oil well pumping unit;

Figure 2 is a section taken approximately on the staggered line II—II of Figure 1; and Figure 3 is a detail section on line III—III of Figure 2.

Referring in detail to the drawing, the numeral 9 represents the crankshaft of an oil well pumping unit which carries a hub 10 caused to positively rotate therewith by means of a key 16 adapted to be engaged with any one of a plurality of key seats 15 milled in the end of the crankshaft.

The hub 10 carries, on the outer periphery thereof, an annular tongue 11 which interfits with a complementary annular groove 12 formed in the crank arm 13. The hub engaging portion of the crank arm is split along the line xy passing through the axis of the crankshaft, as indicated in Figure 4, and nuts 14, carried by bolts secured to the lower portion of the crank arm, serve to clamp the two portions of the crank arm firmly to the central hub. The hub is provided with a plurality of circumferentially spaced recesses 17 which, in the embodiment of the invention illustrated, are located on 90 degree centers. The crank arm carries a screw 18, the inner extremity of which has a dowel portion formed thereon adapted to be selectively engaged with any one of the spaced recesses 17.

Near the outer end of the crank arm there is an opening 19 tapered to match the tapered extremity of a crankpin 20 which is keyed to the crank arm and held fast by a jam nut 21, as shown in Figure 2.

Located in a plane between the plane of rotation of the arm and the plane of rotation of the counterweight proper is a connecting rod 22 which carries a suitable sleeve or roller bearing 23 surrounding the crankpin.

The crankpin 20 is of sufficient length to accommodate on its outer extremity the boss of a wheel-type counterweight supporting member 25. The spaced halves 27—27 of the split boss are adapted to be drawn together by means of nuts 29—29 secured to the opposite extremities of a clamp bolt 28 which pierces said spaced halves.

The wheel-type counterweight supporting member, in addition to being clamped to the crankpin by the force of the nuts 29, is secured thereto by a key 26, as shown. This counterweight supporting member comprises an outer annular rim 30 which is preferably concentric with the crankshaft 9 and an inner rim 31, the two being connected by a web portion 32 with appropriate stiffening ribs 33 spanning the spaces between the rims. The outer rim has formed therein a multiplicity of circumferentially spaced notches 34 for coaction with bolts 35 which pass through suitable apertures 36—36 formed in oppositely disposed counterweights 24—24, these being adapted to be drawn together in the region of the rim 30 by means of nuts 37 on the ends of the bolts 35. These counterweights are similarly adapted to be drawn together near their outer ends by nuts 38 carried by bolts 39.

The parts, as shown and described, provide means whereby adjustment of the equipment can be effected with great ease when the occasion arises, and are applicable to either front and/or back side pumping mechanisms. For example, when it is desirable to relocate the crankpin position this adjustment can be readily accomplished. In devices of the prior art, readjustment of the crankpin requires two men to assist in the removal of the pin and relocation in another position.

With the novel design and arrangement herein disclosed and claimed, one man alone can move the crank arm to the new position. He is not required to remove the pin at all, but simply to slide it around to the new desired location, this adjustment being readily effected by loosening the bolts 14 and rotating the screw 18 to retract the dowel portion from the recess 17, thereupon turning the crank arm relative to the hub 10. The hub is prevented from endwise movement at this time by the interengagement of the tongue 11 and groove 12, and the adjusting movement of the parts is controlled by the amount of friction slip under control of the adjusting nuts 14. Once the crankpin has been shifted to the desired position of readjustment and the dowel screw 18 aligned with a preselected recess 17, the dowel 18 will be screwed home and the nuts 14 again tightened. Similarly, a wide range of adjustment of the position of the counterweights 24 with respect to the wheel-type support may be easily and quickly effected merely by removing the one bolt 35 which engages the notches 34 and then loosening the other bolts to permit sliding of the counterweights along the rim 30 as a guide. When the desired position is reached, the bolt 35 will be reinserted to engage one of the notches 34, whereupon all of the nuts 37 and 38 may be tightened to firmly secure the weights to the wheel-type support.

I claim:

1. In well pumping apparatus, the combination with a horizontally extending rotary shaft, of a hub keyed to said shaft, a crank arm having a tongue and grooved connection with said hub for rotation of the arm about the shaft, means for securing said crank arm in various angular positions about said hub, a horizontally disposed crankpin mounted in said arm and having a free terminal, a pitman mounted on the pin adjacent the crank arm, and a counterweight support member secured to the pin terminal, said member having counterbalance means adjustably mounted thereon in a vertical plane spaced horizontally from the pitman and crank arm.

2. In well pumping apparatus, the combination with the back side of a horizontally extending crankshaft therefor, a hub keyed to the shaft, a crank arm rotatable about the shaft and securable to said hub, dowel means for selectively locating the position of the crank arm relative to the hub and shaft at 90 degree intervals, a crankpin freely extending outwardly from said crank arm, a power-transmitting element and a counterweight supporting structure supported by said pin, said counter-weight support being fixed on the pin and said power-transmitting element being rotatably mounted on said pin between said counterweight support and said crank arm.

3. In well pumping apparatus, a horizontally disposed power shaft, a crank mounted on one end thereof and rotatable therewith, a horizontally disposed crankpin on the crank, a pitman mounted on the crankpin adjacent the crank, a counterbalance secured to the pin outwardly beyond the pitman, said crank, pitman and counterbalance being disposed in spaced vertical planes, the counterbalance having counterweights rotatably adjustable thereon about the crankpin in the plane of the counterbalance, and said crank arm being rotatably adjustable in its plane for angular adjustment of the crankpin and counterbalance about the shaft.

JOHN M. SHIMER.